(12) United States Patent
Su et al.

(10) Patent No.: US 10,599,029 B2
(45) Date of Patent: Mar. 24, 2020

(54) PROJECTION SCREEN

(71) Applicant: Nano Precision Taiwan Limited, Hsinchu County (TW)

(72) Inventors: Fang-Hsuan Su, Hsinchu County (TW); Fu-Chiang Hsu, Hsinchu County (TW); Shu-Ping Yang, Hsinchu County (TW); Ching-Hsiang Li, Hsinchu County (TW); Chi-Tang Hsieh, Hsinchu County (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 0 days.

(21) Appl. No.: 16/403,635

(22) Filed: May 6, 2019

(65) Prior Publication Data
US 2019/0346757 A1 Nov. 14, 2019

(30) Foreign Application Priority Data
May 8, 2018 (CN) ..................... 2018 2 0676894 U

(51) Int. Cl.
| G03B 21/60 | (2014.01) |
| G02B 5/00 | (2006.01) |
| F21V 8/00 | (2006.01) |
| G03B 21/28 | (2006.01) |

(52) U.S. Cl.
CPC .............. *G03B 21/60* (2013.01); *G02B 5/003* (2013.01); *G02B 6/0025* (2013.01); *G03B 21/28* (2013.01)

(58) Field of Classification Search
CPC ...................................................... G03B 21/60
See application file for complete search history.

(56) References Cited

U.S. PATENT DOCUMENTS

| 7,110,176 | B2 | 9/2006 | Maruta et al. |
| 7,262,911 | B2 | 8/2007 | Niwa et al. |
| 10,248,016 | B2* | 4/2019 | Maruta ................ G02B 17/002 |
| 2005/0200952 | A1* | 9/2005 | Niwa ..................... G03B 21/60 |
| | | | 359/459 |
| 2005/0248843 | A1* | 11/2005 | Maruta ................ G03B 21/602 |
| | | | 359/459 |

(Continued)

FOREIGN PATENT DOCUMENTS

| CN | 1670618 A | 9/2005 |
| CN | 203587956 U | 5/2014 |

(Continued)

*Primary Examiner* — Christopher E Mahoney

(57) ABSTRACT

A projection screen includes a substrate, a plurality of prism structures, and a plurality of light absorbing structures. The substrate includes a first surface adjacent to the projector and a second surface away from the projector. The prism structures are disposed on the first surface, and each of the prism structures includes a first inclined surface, a second inclined surface, and a bottom surface. The first inclined surface is configured to receive and reflect projection light beams. There is a first angle between the first inclined surface and the bottom surface, and a second angle between the second inclined surface and the bottom surface. The first angle is less than or equal to the second angle. The light absorbing structures are respectively disposed on at least a portion of the second inclined surface of each of the prism structures. The light absorbing structures are configured to absorb ambient light.

15 Claims, 5 Drawing Sheets

(56) References Cited

U.S. PATENT DOCUMENTS

2014/0092471 A1* 4/2014 Sadahiro ............... G03B 21/60
359/449

FOREIGN PATENT DOCUMENTS

| TW | I385468 B | 2/2013 |
| TW | M520656 U | 4/2016 |
| TW | I582523 B | 5/2017 |

* cited by examiner

PROJECTION SCREEN

CROSS-REFERENCE TO RELATED APPLICATION

This application claims the priority benefit of China application 201820676894.X, filed on 2018 May 8. The entirety of the above-mentioned patent application is hereby incorporated by reference herein and made a part of this specification.

FIELD OF THE INVENTION

The invention relates to an optical element, and more particularly to a projection screen.

BACKGROUND OF THE INVENTION

The projection screen of a conventional projection display system does not emit light, so the projection screen itself cannot produce an image. Image light beams are transmitted to a viewer after being projected by a projector on the projection screen. Therefore, design of the projection screen has a great influence on brightness and contrast of the image.

The projection display system is generally affected by ambient light, and when projection light beams are projected onto a conventional white projection screen without structure, most of the projection light beams are reflected to a place without a viewer. For the viewer located directly in front of the projection screen, images with sufficient contrast and brightness are failed to provide.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection screen, which can improve the quality of the image.

Other advantages and objects of the invention may be further illustrated by the technical features broadly embodied and described as follows.

In order to achieve one or a portion of or all of the objects or other objects, a projection screen provided in an embodiment of the invention includes a substrate, a plurality of prism structures, and a plurality of light absorbing structures. The substrate includes a first surface and a second surface opposite to the first surface, wherein the first surface is adjacent to the projector, and the second surface is away from the projector. The prism structures are disposed on the first surface of the substrate, and each of the prism structures includes a first inclined surface and a second inclined surface that are inclined toward each other, and a bottom surface that is connected between the first inclined surface and the second inclined surface. The first inclined surface is configured to receive and reflect projection light beams. The bottom surface is joined to the first surface of the substrate, and there is a first angle between the first inclined surface and the bottom surface, and a second angle between the second inclined surface and the bottom surface. The first angle is less than or equal to the second angle. The light absorbing structures are respectively disposed on at least a portion of the second inclined surface of each of the prism structures. The light absorbing structures are configured to absorb ambient light.

In the projection screen of the embodiment of the invention, since the first angle of each of the prism structures is less than or equal to the second angle, the first inclined surface can receive most of the projection light beams and reflect them to a viewer, and the projection light beams can be utilized efficiently to improve the brightness of the image. The second inclined surface can receive most of the ambient light, and since at least a portion of the second inclined surface is provided with the light absorbing structures, the ambient light can be absorbed, thereby reducing the ambient light reflected to the viewer. Even if the first inclined surface receives the ambient light, because the first angle is less than or equal to the second angle, the ambient light is hard to be reflected to the viewer, thus the image can have better contrast. Therefore, the projection screen of the embodiment of the invention can improve the quality of the image.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
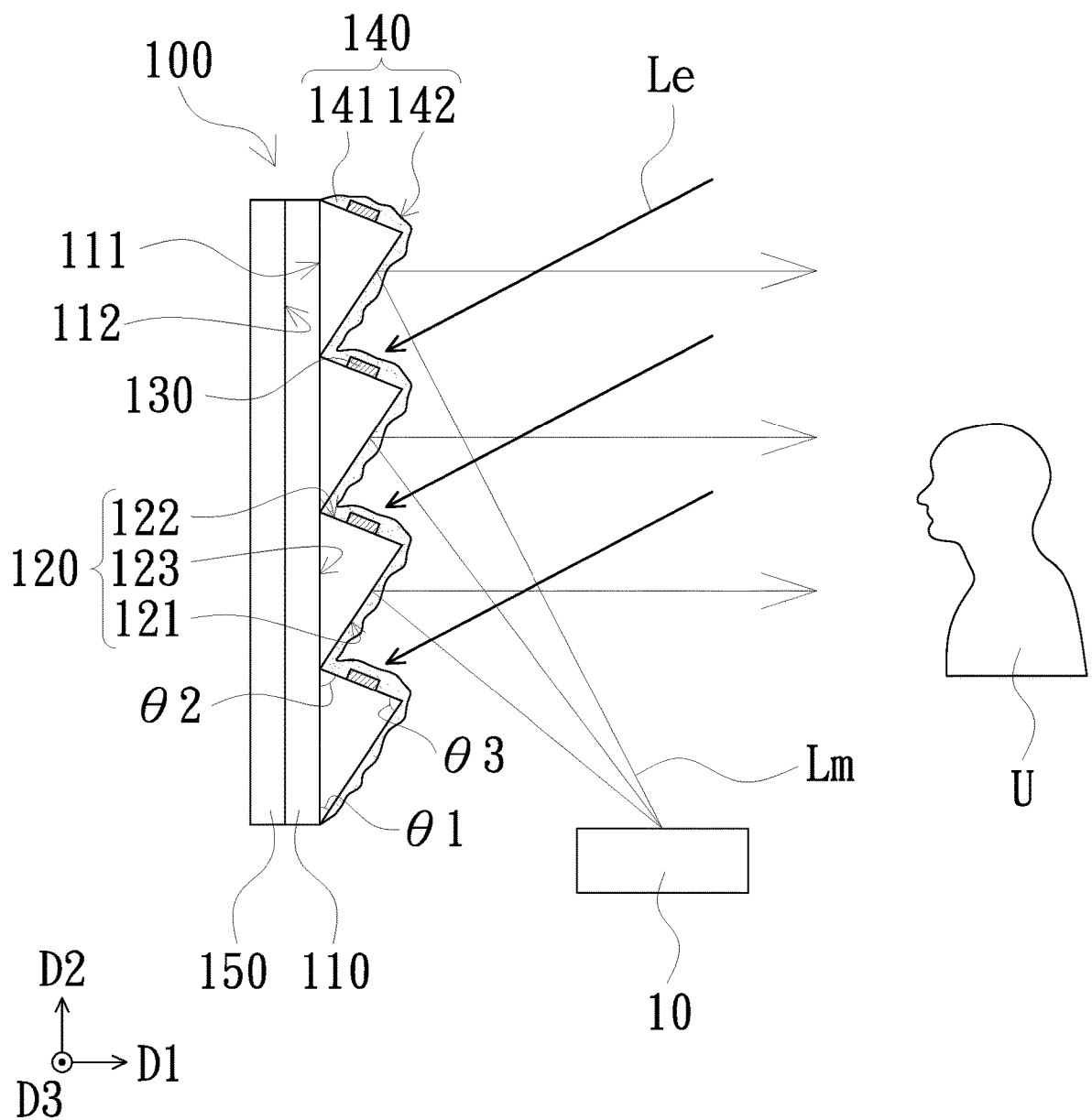
FIG. 1 is a schematic diagram of a use of a projection screen of one embodiment of the invention.

FIG. 1 is a schematic diagram of a use of a projection screen of one embodiment of the invention. Referring to FIG. 1, a projection screen 100 of the embodiment is configured to receive projection light beams Lm provided by a projector 10 and ambient light Le from outside. The projector 10 is, for example, a short throw projector, but is not limited thereto. The projector 10 is disposed on a side of the projection screen 100 close to a viewer U, and is located below a sight of the viewer U, but is not limited thereto. The projection screen 100 includes a substrate 110, a plurality of prism structures 120, and a plurality of light absorbing structures 130. The substrate 110 includes a first surface 111 and a second surface 112 opposite to the first surface 111, wherein the first surface 111 is adjacent to the projector 10, and the second surface 112 is away from the projector 10. The prism structures 120 are disposed on the first surface 111 of the substrate 110, and each of the prism structures 120 includes a first inclined surface 121 and a second inclined surface 122 that are inclined toward each other, and a bottom surface 123 that is connected between the first inclined surface 121 and the second inclined surface 122. The first inclined surface 121 is configured to receive the projection light beams Lm from the projector 10 and guide the projection light beams Lm to be transmitted to the viewer in the first direction D1. The bottom surface 123 is joined to the first surface 111 of the substrate 110. The prism structures 120 are made of, for example, a reflective material, or the first inclined surface 121 and the second inclined surface 122 are plated with a reflective layer, thereby having a reflective function. The light absorbing structures 130 are respectively disposed on at least a portion of the second inclined surface 122 of each of the prism structures 120. The light absorbing structures 130 are configured to absorb ambient light Le. The light absorbing structures 130 are made of, for example, a black pigment, a gel doped with a black material, or other materials having a high light absorptivity.

The first inclined surface 121 and the second inclined surface 122 of each of the prism structures 120 are, for example, flat surfaces, but are not limited thereto. In another embodiment, the first inclined surface 121 is, for example, a first curved surface, and the second inclined surface 122 is a second curved surface, and the curvature of the first curved surface and the curvature of the second curved surface are the same or different.

There is a first angle $\theta 1$ between the first inclined surface 121 and the bottom surface 123, and a second angle $\theta 2$ between the second inclined surface 122 and the bottom surface 123. The first angle $\theta 1$ is, for example, less than or equal to the second angle $\theta 2$. By a design of the first angle $\theta 1$ and the second angle $\theta 2$, the first inclined surface 121 can receive most of the projection light beams Lm and reflect the projection light beams Lm in a first direction D to the viewer U, and most of the ambient light Le is absorbed by the light absorbing structures 130 on the second inclined surface 122. In one embodiment, an angle of the first inclined surface 121 is, for example, $10° \leq \theta 1 \leq 50°$, and an angle of the second inclined surface 122 is, for example, $50° \leq \theta 2 \leq 90°$.

The prism structures 120 are arranged along a distribution direction D2. Each of the prism structures is, for example, a columnar structure extending along an extending direction D3. The distribution direction D2 is not parallel to the extending direction D3. In the embodiment, the first direction D1, the distribution direction D2 and the extension direction D3 are, for example, perpendicular to each other.

Figure 2A:
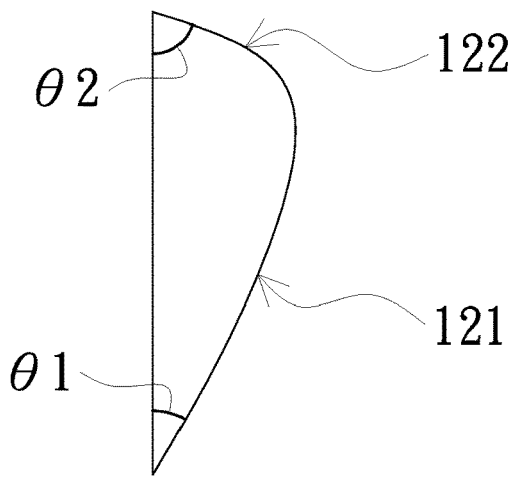
FIG. 2A and FIG. 2B are schematic diagrams of a prism structure of other embodiments of the invention.
Figure 2B:
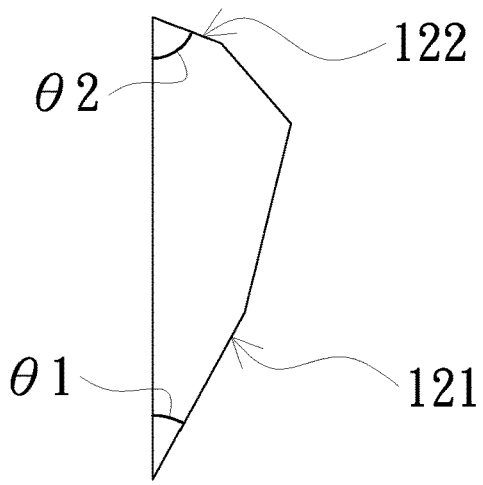
Figure 3:
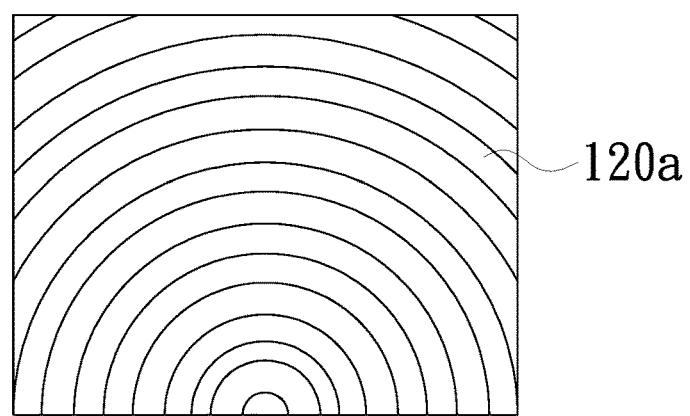
FIG. 3 is a schematic diagram showing a distribution of a plurality of prism structures of one embodiment of the invention.

The columnar structure (prism structure 120) is, for example, a triangular prism, but is not limited thereto. The triangular prism includes a vertex angle $\theta 3$ away from the bottom surface 123 and two base angles opposite to each other (in the embodiment, the base angles are the first angle $\theta 1$ and the second angle $\theta 2$). FIG. 2A and FIG. 2B are schematic diagrams of a prism structure of other embodiments of the invention. Referring to FIG. 2A and FIG. 2B, in other embodiments, the vertex angle of the triangular prism is, for example, a fillet. Alternatively, the columnar structure is, for example, other polygonal column. The polygonal column includes, for example, a plurality of vertex angles away from the bottom surface 123 and two base angles opposite to each other (in the embodiment of FIG. 2B, the base angles are the first angle $\theta 1$ and the second angle $\theta 2$), and each of the vertex angles of the polygonal column can be, for example, a fillet. In addition, the arrangement of the prism structures is not limited thereto. For example, in another embodiment shown in FIG. 3, the columnar structures (prism structures 120a) are, for example, curved columns, and the columnar structures are arranged in concentric semicircles along the distribution direction, that is, a structure similar to a half Fresnel lens.

In the projection screen 100 of the embodiment, since the first angle $\theta 1$ of each of the prism structures 120 is less than or equal to the second angle $\theta 2$, the first inclined surface 121 can receive most of the projection light beams Lm and reflect in the first direction D1 to the viewer U, and the projection light beams Lm can be utilized efficiently to improve the brightness of the image. The second inclined surface 122 can receive most of the ambient light Le, and since at least a portion of the second inclined surface 122 is provided with the light absorbing structures 130, the ambient light Le can be absorbed, thereby reducing the ambient light Le reflected to the viewer U. Even if the first inclined surface 121 receives the ambient light Le, because the first angle $\theta 1$ is less than or equal to the second angle $\theta 2$, the ambient light Le is hard to be reflected to the viewer U, thus the image can have better contrast. Therefore, the projection screen 100 of the embodiment of the invention can improve the quality of the image.

The projection screen 100 further includes, for example, a diffusion structure 140 disposed on the first inclined surface 121 of the prism structures 120, the second inclined surface 122 of the prism structures 120, and the light absorbing structures 130 of the prism structures 120. The diffusion structure 140 forms a continuous curved structure along the first inclined surface 121 and the second inclined surface 122. The diffusion structure 140 includes a plurality of diffusion particles 141, and a surface 142 of the diffusion structure 140 is, for example, a roughened surface, but is not limited thereto. Since the roughened surface has a diffusion effect, the projection light beams Lm reflected by the prism structures 120 can be diffused to lessen the bright line of the projection screen 100. In another embodiment that does not include the diffusion structure 140, the first inclined surface 121 and the second inclined surface 122 of the prism structures 120 may be roughened surfaces, respectively, to achieve the diffusion effect of the diffusion structure 140.

In addition to the light absorbing structures 130 disposed on the second inclined surface 122, the projection screen 100 further includes, for example, a light absorbing layer 150. The light absorbing layer 150 is disposed on the second surface 112 of the substrate 110. The light absorbing layer 150 is made of, for example, a black pigment, a gel doped with a black material, or other materials having a high light absorptivity. On the projection screen 100, a region projected by more projection light beams Lm may slightly generate a bright line. The light absorbing layer 150 can lessen the bright lines to improve the overall brightness uniformity of the projection screen 100. In addition, the light absorbing layer 150 can also absorb the ambient light Le.

Figure 4:
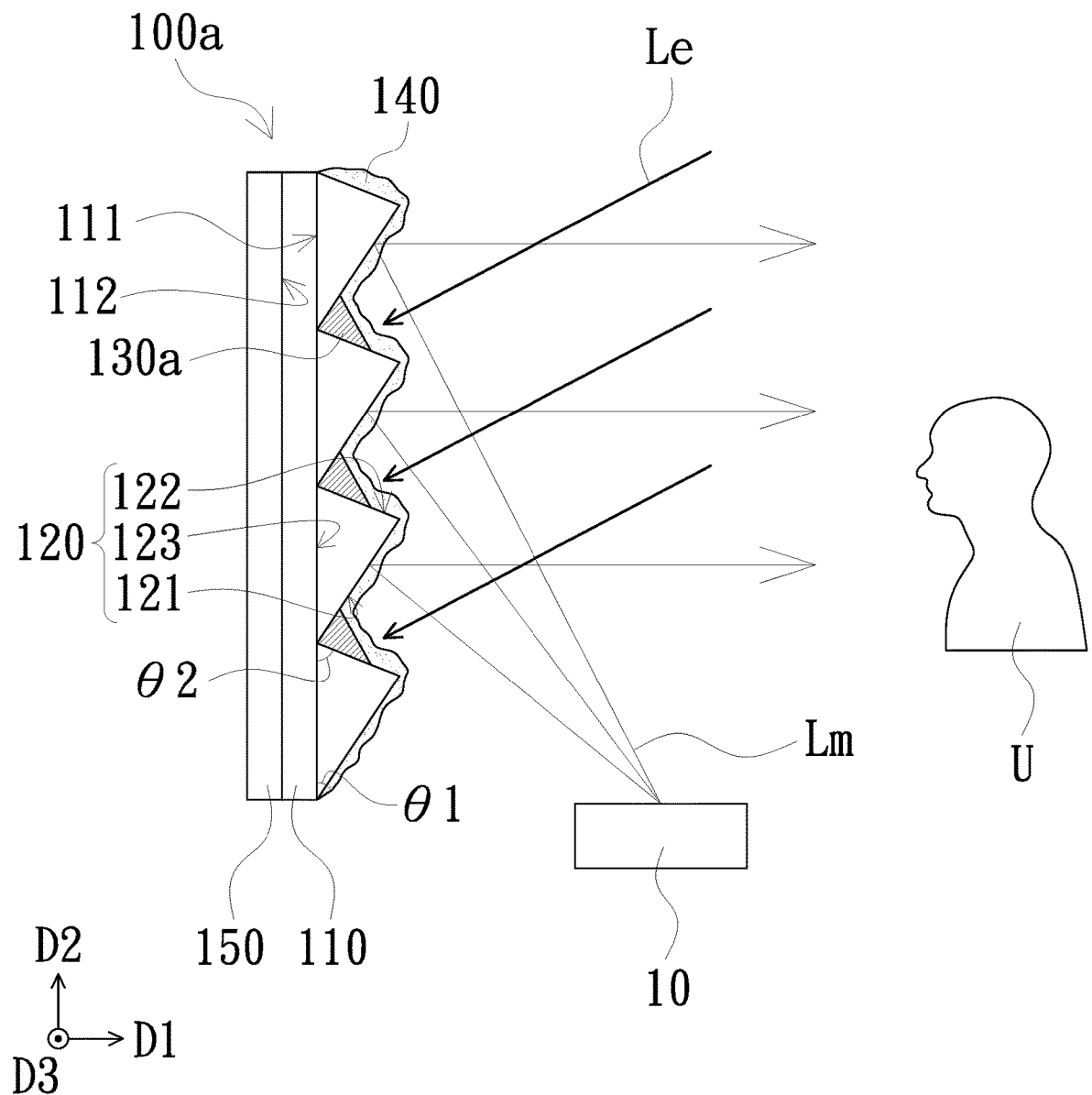
FIG. 4 is a schematic diagram of a use of a projection screen of another embodiment of the invention.
Figures 5A, 5B, 5C:
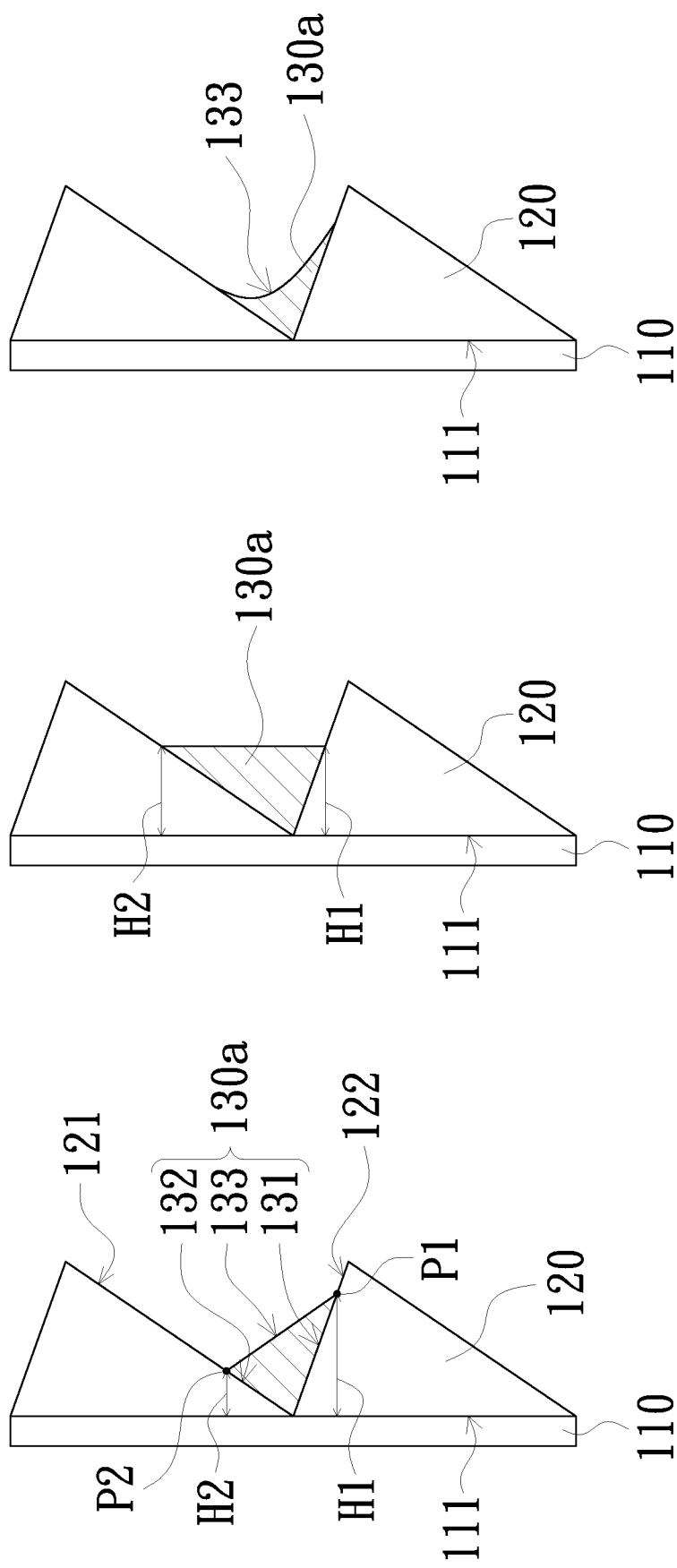
FIG. 5A is a partial schematic diagram of the projection screen of FIG. 4.
FIG. 5B and FIG. 5C are schematic diagrams of other embodiments of FIG. 5A.

FIG. 4 is a schematic diagram of a use of a projection screen of another embodiment of the invention. FIG. 5A is a partial schematic diagram of the projection screen of FIG. 4. Referring to FIG. 4 and FIG. 5A, the projection screen 100a of the embodiment is similar in structure and advantages to the projection screen 100, and the main differences of the structure are illustrated below. In the projection screen 100a of the embodiment, each light absorbing structure 130a extends from the second inclined surface 122 of one prism structure 120 to the first inclined surface 121 of adjacent another prism structure 120. For illustration, FIG. 5A shows only two prism structures 120, but the quantity of the prism structures 120 is not limited thereto.

Each of the light absorbing structures 130a includes, for example, a first faying surface 131, a second faying surface 132, and a light absorbing surface 133 connected between the first faying surface 131 and the second faying surface 132. The first faying surface 131 is joined to the corresponding second inclined surface 122 of the prism structure 120. The second faying surface 132 is joined to the corresponding first inclined surface 121 of the prism structure 120. The first faying surface 131 has a first end point P1 away from the first surface 111 of the substrate 110. The second faying surface 132 has a second end point P2 away from the first surface 111 of the substrate 110. The first end point P1 is at a first distance H1 from the first surface 111 of the substrate 110, and the first distance H1 is a vertical distance from the first end point P1 to the first surface 111. The second end point P2 is at a second distance H2 from the first surface 111 of the substrate 110, and the second distance H2 is a vertical distance from the second end point P2 to the first surface 111. The first distance H1 is, for example, greater than the second distance H2. The light absorbing surface 133 is, for example, a flat surface. With the design, the light absorbing structures 130a can easily absorb most of the ambient light Le to reduce the reflection of the ambient light Le to the viewer U, as can be achieved by the light absorbing structures 130.

FIG. 5B and FIG. 5C are schematic diagrams of other embodiments of FIG. 5A. Referring to FIG. 5B and FIG. 5C, the light absorbing structures 130a are not particularly limited in design, as long as the light absorbing structures 130a can easily absorb most of the ambient light Le. For example, the first distance H1 can also be equal to the second distance H2 (as shown in FIG. 5B), or the light absorbing surface 133 of each light absorbing structure 130a is a curved surface incurvated toward the first surface 111 of the substrate 110 (as shown in FIG. 5C).

In the embodiments of the projection screen 100, 100a, by the combination of the prism structures 120, 120a and the light absorbing structures 130, 130a, most of the projection light beams Lm can be reflected to the viewer U, and the projection light beams Lm can be utilized efficiently to improve the brightness of the image. Most of the ambient light Le is absorbed to reduce the reflection of the ambient light Le to the viewer U, which improves the contrast of the image. The following will illustrate the improvement in the contrast of the image of the invention compared with conventional available products by experiment.

Figure 6:
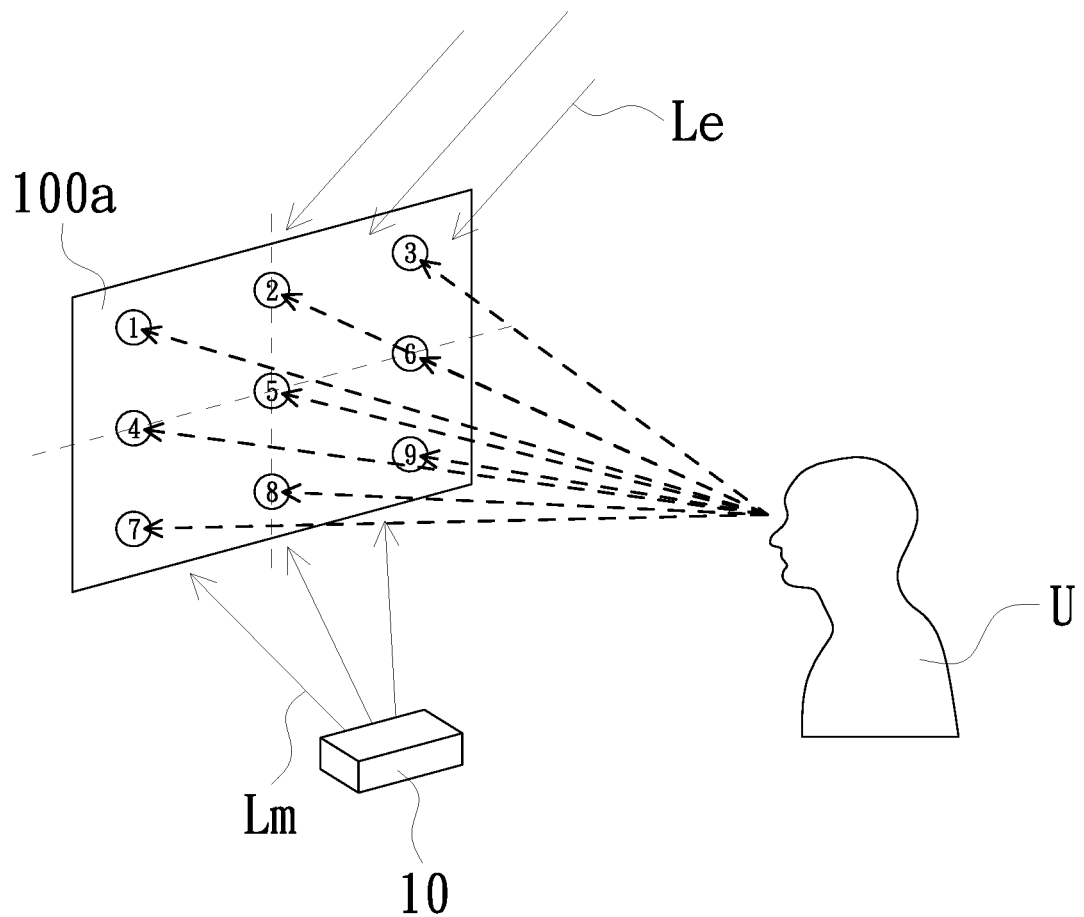
FIG. 6 is a schematic diagram of an image contrast experiment of a projection screen of one embodiment of the invention.

FIG. 6 is a schematic diagram of an image contrast experiment of a projection screen of one embodiment of the invention. Referring to FIG. 6, the experiment is performed by the projection screen 100a of the embodiment. The experiment is divided into two stages: dark room white and bright room black. In the dark room white stage, there is no ambient light Le from the outside, and only the projection light beam Lm of the projector 10 is projected onto the projection screen 100a and then reflected to the viewer U. At this time, a luminance value of a P5 point (i.e. a position in a center) of the projection screen 100a is measured, and is counted as B1. In the bright room black stage, only ambient light Le from the outside is projected onto the projection screen 100a, and then reflected to the viewer U. The projector 10 is turned off. At this time, the luminance value of the P5 point of the projection screen 100a is measured, and is counted as B2. Substituting the luminance values into a formula: CR=(B1+B2)/B2, a resulting value CR is the contrast of the image.

Experimental results of the projection screen 100a of the embodiment of the invention and a commercially available product without structure are shown in Table 1 below.

TABLE 1

| | luminance value B1 | luminance value B2 | contrast CR |
|---|---|---|---|
| commercially available product without structure | 99.9 | 40.1 | 3.49 |
| projection screen 100a of the embodiment of the invention | 62.8 | 7.27 | 9.64 |

Luminance Value Unit: Nits

It can be seen from the experimental results that the contrast of the image of the projection screen 100a of the embodiment of the invention is higher than the contrast of the image of the commercially available product without structure, which shows that the projection screen 100a of the embodiment of the invention is more realistic in the presentation of the color of the image than the commercially available products.

In summary, in the projection screen of the embodiment of the invention, since the first angle of each of the prism structures is less than or equal to the second angle, the first inclined surface can receive most of the projection light beams and reflect them to a viewer, and the projection light beams can be utilized efficiently to improve the brightness of the image. The second inclined surface can receive most of the ambient light, and since at least a portion of the second inclined surface is provided with the light absorbing structures, the ambient light can be absorbed, thereby reducing the ambient light reflected to the viewer. Even if the first inclined surface receives the ambient light, because the first angle is less than or equal to the second angle, the ambient light is hard to be reflected to the viewer, thus the image can have better contrast. Therefore, the projection screen of the embodiment of the invention can improve the quality of the image.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface, the second surface, the first inclined surface, the second inclined surface, the first curved surface, the second curved surface, the first faying surface, the second faying surface, the first distance, the second distance, the first end point, the second end point, the first angle, the second angle and the first direction are only used for distinguishing various elements and do not limit the number of the elements.

What is claimed is:

1. A projection screen, configured to receive projection light beams provided by a projector and ambient light from outside, the projection screen comprising:
    a substrate, comprising a first surface and a second surface opposite to the first surface, wherein the first surface is adjacent to the projector, and the second surface is away from the projector;
    a plurality of prism structures, disposed on the first surface of the substrate, wherein each of the plurality of prism structures includes a first inclined surface and a second inclined surface that are inclined toward each other, and a bottom surface that is connected between the first inclined surface and the second inclined surface, the first inclined surface is configured to receive and reflect the projection light beams, the bottom surface is joined to the first surface of the substrate, and there is a first angle between the first inclined surface and the bottom surface, and a second angle between the second inclined surface and the bottom surface, and the first angle is less than or equal to the second angle; and
    a plurality of light absorbing structures, respectively disposed on at least a portion of the second inclined surface of each of the plurality of prism structures, wherein the plurality of light absorbing structures are configured to absorb the ambient light,
    wherein each of the plurality of light absorbing structures extends from the second inclined surface of one of the plurality of prism structures to the first inclined surface of adjacent one of the plurality of the plurality of prism structures.

2. The projection screen according to claim 1, wherein the first angle is θ1, and 10°≤θ1≤50°, and the second angle is θ2, and 50°≤θ2≤90°.

3. The projection screen according to claim 1, further comprising a diffusion structure disposed on the first inclined surfaces of the plurality of prism structures, the second inclined surfaces of the plurality of prism structures, and the plurality of light absorbing structures of the plurality of prism structures, wherein the diffusion structure forms a continuous curved structure along the first inclined surfaces and the second inclined surfaces.

4. The projection screen according to claim 1, wherein the first inclined surfaces and the second inclined surfaces of the plurality of prism structures are respectively roughened surfaces.

5. The projection screen according to claim 1, wherein the first inclined surface of each of the plurality of prism structures is a first curved surface, and the second inclined surface of each of the plurality of prism structures is a second curved surface.

6. The projection screen according to claim 1, further comprising a light absorbing layer disposed on the second surface of the substrate.

7. The projection screen according to claim 1, wherein each of the plurality of light absorbing structures comprises a first faying surface, a second faying surface, and a light absorbing surface connected between the first faying surface and the second faying surface, the first faying surface is joined to the corresponding second inclined surface, the second faying surface is joined to the corresponding first inclined surface, the first faying surface has a first end point away from the first surface, the second faying surface has a second end point away from the first surface, the first end point is at a first distance from the first surface, the second end point is at a second distance from the first surface, and the first distance is greater than or equal to the second distance.

8. The projection screen according to claim 7, wherein the light absorbing surface of each of the plurality of light absorbing structures is a flat surface.

9. The projection screen according to claim 7, wherein the light absorbing surface of each of the plurality of light absorbing structures is a curved surface incurvated toward the first surface of the substrate.

10. The projection screen according to claim 1, wherein the plurality of prism structures are arranged along a distribution direction, and each of the plurality of prism structures is a columnar structure extending along an extending direction, and the distribution direction is not parallel to the extending direction.

11. The projection screen according to claim 10, wherein each of the columnar structures is a curved column, and the columnar structures are arranged in concentric semicircles along the distribution direction.

12. The projection screen according to claim 10, wherein each of the columnar structures is a triangular prism, and the triangular prism comprises a vertex angle away from the bottom surface and two base angles opposite to each other.

13. The projection screen according to claim 12, wherein the vertex angle of the triangular prism is a fillet.

14. A projection screen, configured to receive projection light beams provided by a projector and ambient light from outside, the projection screen comprising:
   a substrate, comprising a first surface and a second surface opposite to the first surface, wherein the first surface is adjacent to the projector, and the second surface is away from the projector;
   a plurality of prism structures, disposed on the first surface of the substrate, wherein each of the plurality of prism structures includes a first inclined surface and a second inclined surface that are inclined toward each other, and a bottom surface that is connected between the first inclined surface and the second inclined surface, the first inclined surface is configured to receive and reflect the projection light beams, the bottom surface is joined to the first surface of the substrate, and there is a first angle between the first inclined surface and the bottom surface, and a second angle between the second inclined surface and the bottom surface, and the first angle is less than or equal to the second angle; and
   a plurality of light absorbing structures, respectively disposed on at least a portion of the second inclined surface of each of the plurality of prism structures, wherein the plurality of light absorbing structures are configured to absorb the ambient light,
   wherein the plurality of prism structures are arranged along a distribution direction, and each of the plurality of prism structures is a columnar structure extending along an extending direction, and the distribution direction is not parallel to the extending direction, each of the columnar structures is a polygonal column, and the polygonal column comprises a plurality of vertex angles away from the bottom surface and two base angles opposite to each other.

15. The projection screen according to claim 14, wherein each of the plurality of vertex angles of the polygonal column is a fillet.

* * * * *